United States Patent [19]
Roberts

[11] 4,106,871
[45] Aug. 15, 1978

[54] CONTACT PRINTER HOLDER

[75] Inventor: William E. Roberts, Palos Verdes Penn., Calif.

[73] Assignee: Addressograph Multigraph Corporation, Cleveland, Ohio

[21] Appl. No.: 823,912

[22] Filed: Aug. 12, 1977

Related U.S. Application Data

[63] Continuation-in-part of Ser. No. 652,635, Jan. 26, 1976.

[51] Int. Cl.² .............................................. G03B 27/04
[52] U.S. Cl. ...................................... 355/99; 355/122
[58] Field of Search ...................... 355/100, 99, 48, 50, 355/78, 79, 97, 113, 122, 123

[56] References Cited

U.S. PATENT DOCUMENTS

| | | | |
|---|---|---|---|
| 2,929,309 | 3/1960 | Young | 355/91 |
| 3,715,156 | 2/1973 | Levy | 355/99 X |
| 3,858,975 | 1/1975 | Knechtel et al. | 355/50 |

FOREIGN PATENT DOCUMENTS 1,175,990  5/1962  Fed. Rep. of Germany ........... 355/100

*Primary Examiner*—Donald A. Griffin
*Attorney, Agent, or Firm*—Michael A. Kondzella

[57] ABSTRACT

Apparatus for holding a master microfiche in contact with a copy sheet of film in a machine that includes rollers for moving the copy sheet onto the master and then off of it towards a developing station. The holder includes a base or lower frame containing a glass plate, and an upper frame that can move away from the lower frame to enable the insertion of the master between the upper frame and the glass plate. The upper frame includes thin rollers rotatably mounted about a vertical axis and having peripheral portions lying over the edge of a master on the lower frame. A transport roller for feeding a copy film onto the master, can bear against the periphery of the thin roller, so that the copy film is captured between the two rollers to facilitate its movement. The frame can be lifted by pivoting down a handle at one side of the holder, which slides a pair of rods with camming portions that move against the upper frame to lift it.

14 Claims, 11 Drawing Figures

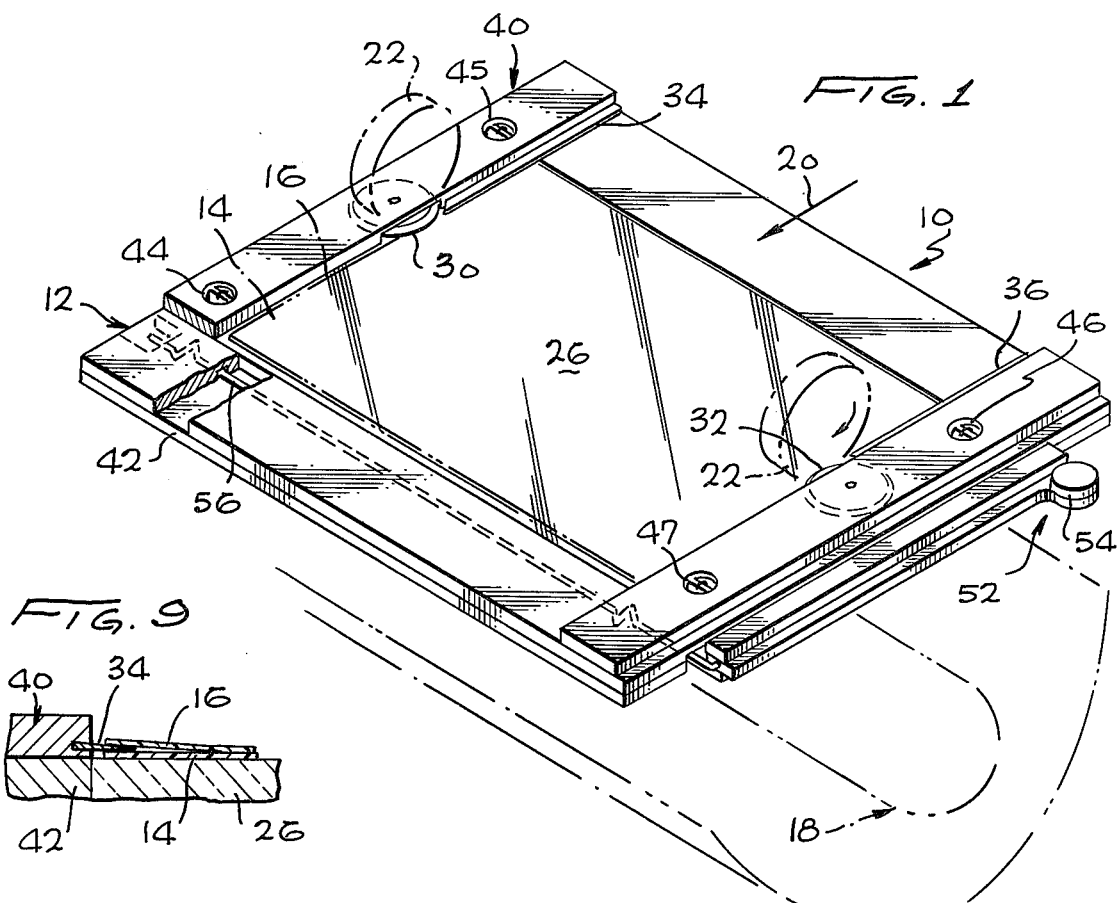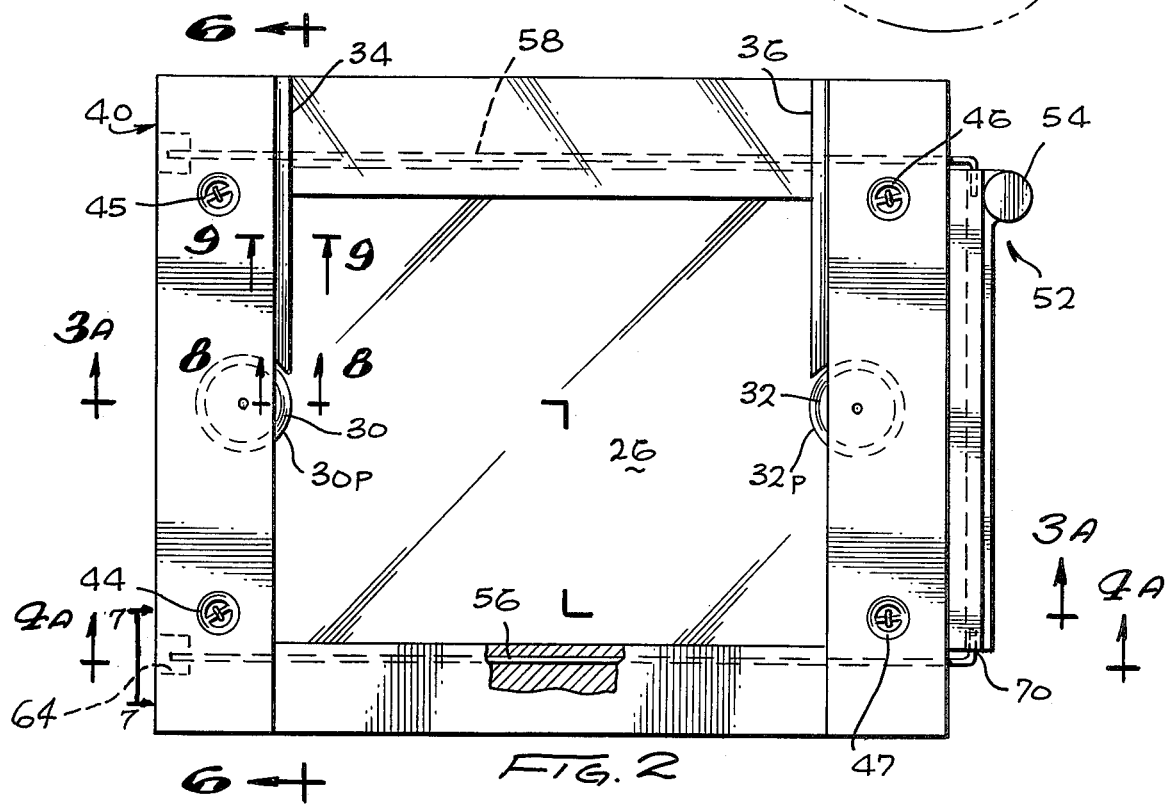

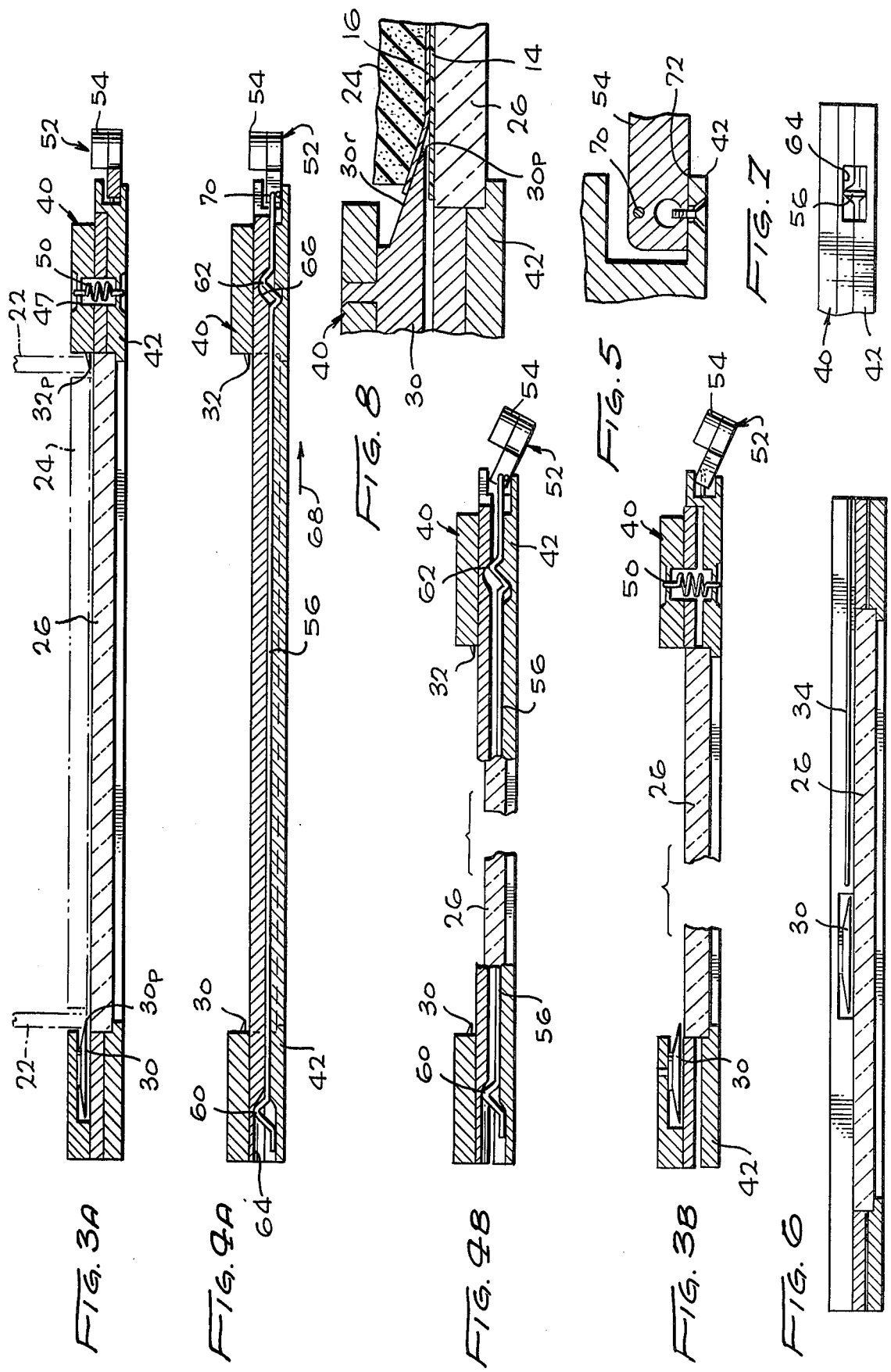

4,106,871

CONTACT PRINTER HOLDER

CROSS-REFERENCE TO RELATED APPLICATIONS

This is a continuation-in-part of U.S. patent application Ser. No. 652,635 filed Jan. 26, 1976.

BACKGROUND OF THE INVENTION

This invention relates to contact printers, and to a holding device for holding a master and a sheet of film to be exposed, in close facewise contact.

A machine for automatically duplicating a microfiche may include an exposure station, where the master microfiche is positioned on a glass plate, a copy sheet of unexposed film is moved onto the master, light is directed through the master to the copy sheet to expose it, and the exposed copy sheet is moved away from the master to a developing station. Movement of the copy sheet into and out of the exposure station can be accomplished by pairs of rollers that press against opposite surfaces of the sheet. However, such rollers cannot be easily positioned in the middle of the exposure station so as to carry the copy sheet to a position precisely over the master, and then to move away the copy sheet after exposure. A simple mechanism that enabled the use of a roller drive to move the copy sheet onto and away from the master, which allowed the copy sheet to lie facewise in contact with the master at all areas where information is traditionally contained on the master, and which avoided damaging the master, would be of considerable use in the construction of microfiche duplicators and other equipment.

SUMMARY OF THE INVENTION

In accordance with one embodiment of the present invention, a contact printer holder of relatively simple design is provided which enables the reception and removal of film sheets with ease. The holder includes a base with a transparent plate, and a frame which can lift off and return against the base to enable the reception of a master microfiche. The frame can include a pair of rollers mounted about vertical axes, the rollers having thin peripheries to leave only a small space between the edges of a master lying under the rollers and a copy sheet lying over them. A pair of transport rollers mounted about horizontal axes, can then be positioned with their edges adjacent to the thin rollers on the holder, to move a copy sheet onto and off of the holder.

The mechanism for lifting the frame to permit insertion of a master microfiche under the rollers, can include a pair of rods extending across the width of the holder base, near opposite ends thereof, and a handle pivotally mounted at the side of the holder and connected to the ends of the rods. When the handle pivots, the rods slide, and cams on the rods lift up four locations on the frame.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a contact printer holder constructed in accordance with the present invention;

FIG. 2 is a plan view of the holder of FIG. 1;

FIG. 3A is a view taken on the line 3A—3A of FIG. 2, at a time when the frame lies on the base;

FIG. 3B is a view similar to FIG. 3A, but showing the frame lifted off the base;

FIG. 4A is a view taken on the line 4A—4A of FIG. 2, showing the lifting mechanism of the holder during operation, but just prior to lifting up of the frame;

FIG. 4B is a view similar to FIG. 4A, but showing the holder after complete operation of the lifting mechanism to lift up the frame;

FIG. 5 is an enlarged partial view of a portion of the mechanism of FIG. 3A;

FIG. 6 is a view taken on the line 6—6 of FIG. 2;

FIG. 7 is a view taken on the line 7—7 of FIG. 2;

FIG. 8 is a view taken on the line 8—8 of FIG. 2; and

FIG. 9 is a view taken on the line 9—9 of FIG. 2.

DESCRIPTION OF THE PREFERRED EMBODIMENTS

FIG. 1 illustrates a portion of an exposure station 10 which includes a holder 12 of the present invention which can hold a master microfiche 14 and a copy sheet 16 of unexposed photographic film in intimate contact, while light from a light source 18 is directed through the master 14 onto the copy sheet 16 to expose it. The copy sheet can be fed in the direction of arrow 20 onto the master 14 by a pair of transport rollers 22 until the copy sheet lies directly over the master 14. The holder then can be lifted up against a resilient backing pad 24 shown in FIG. 3A, so that the master and copy sheet are pressed into intimate contact, between the backup pad 24 and the glass plate 26 on which the master lies. The light source 18 (FIG. 1) is operated, and the transport rollers 22 are then turned to move the copy sheet in the direction of arrow 20 off the holder and towards a developing station. It may be noted that the master sometimes includes a thin jacket around a sheet of microfilm, and if the copy sheet is pressed against the jacket good copies can be produced.

When the transport rollers 22 turn to move the copy sheet 16, it is important that the rollers do not also move the master 14. If the transport rollers 22 were to directly contact the master 14 before the copy sheet is fed under the transport rollers, or after the trailing edge of the copy sheet passes by the transport rollers, then the master sheet would tend to move. Also, if the transport rollers 22 pressed the copy sheet directly against the master, then the moving copy sheet would tend to drag the master along with it. To avoid movement of the master or damage to it caused by tending to drag it along the copy sheet path, a pair of separators in the form of rollers 30, 32 are provided which have portions lying directly under the transport rollers 22. The rollers are mounted about axes perpendicular to the plane of the glass plate 26. The side edges of the master 14 lie under the peripheral portions of the separator rollers 30, 32, while the side edges of the copy sheet 16 lie over the peripheral portions of the separator rollers and are caught between them and the edges of the transport rollers. This is accomplished by shaping the edge guide 36 to cam the copy film above the roller. As a result, when the transport rollers 22 rotate, there is little drag on the copy sheet since its lower surface is backed by the rotating separator rollers 30, 32. The fact that the copy sheet does not bear against the master at the point where the transport roller presses down on the copy sheet, also results in low frictional forces between the moving copy sheet and master. It may be noted that nonrotating separator elements of low sliding friction material can be used instead of rollers, although rolling contact normally provides the lowest friction.

The use of the separator rollers, 30, 32 could prevent intimate contact of the master with the copy sheet; such intimate contact is necessary to produce a sharp image on the copy sheet. Blurring of the image is avoided by providing the separation rollers with very thin peripheral portions 30p, 32p. (FIG. 3), less than 0.050 inch mils (thousandths inch) at all separator portions that lie between the film sheets for typical microfiche sheets of about 5 mil thickness. The small roller thickness results in the copy sheet and master being only slightly spaced apart at their edges, and this slight spacing does not prevent intimate contact of master and copy sheet because the edges of the separator rollers extend only a small distance into the region between the region between the sheets. Microfiche sheets normally do not have images very close to their edges, and therefore no image blurring will occur by reason of the slight separation of the edges. The fact that the edges of the sheets are only slightly separated means that the backup pad 24 can extend to a position very close to the region where the sheets are slightly separated by the edge of the separator rollers, without damaging either of the sheets, as shown in FIG. 8.

The separator rollers 30, 32 are preferably formed, as illustrated in FIG. 8, so their radially outer portion 30r slopes downwardly and radially outwardly, and with the periphery of the roller being substantially at the bottom thereof. This shape minimizes the area at which the copy sheet is unsupported by both the roller and the master. It may be noted that the peripheral portion of the separator roller at 30p, where it is thinnest, is curved down, to avoid the possibility of a sharp edge cutting the copy sheet.

In order to guide the copy sheet onto the peripheral portions of the separator rollers 30, 32 and avoid jamming of the copy sheet under the separator rollers, a pair of edge guides 34, 36 (FIG. 1) are provided that extend close to the separator rollers. Each of the edge guides is a thin member so that, like the separator roller edges, the copy sheet and master are only slightly separated along the edge guides, as shown in FIG. 9. The edge guides 34, 36 bear against the master 14 to resist movement of the master 14. It is also possible to provide laterally-extending members over the opposite ends of the base (over the rods 56, 58) to hold down the master.

In order to allow the insertion and removal of the master 14 from under the edge guides 34, 36 and separator rollers 30, 32 the edge guides and rollers are mounted on a frame 40 that lies on a base 42 of the holder. The frame can move up away from the base 42, but is biased downwardly towards the base at four locaations 44–47. As shown in FIG. 3A, a spring 50 provided at each of the biasing locations, is preloaded and has opposite ends respectively attached to the base 42 and frame 40. A mechanism 52 for lifting the frame slightly above the base includes a handle 54 which can be depressed by the thumb of an operator. The handle 52 is connected to two camming rods 56, 58 which extend across the width of the base 42 at opposite ends thereof. As shown in FIG. 4A, the rod 56 has two upwardly bowed camming portions 60, 62 that lie in cutout regions 64, 66 of the frame whose walls form cam followers. When the rod 56 slides in the direction of arrow 68, the camming regions 60, 62 press against the frame 40 to lift it, as shown in FIG. 4B. The rod 56 has an end 70 pivotally attached to the handle 54. The handle can pivot on an edge 72 of the base 42. The end 70 of the rod is located above the edge 72 on which the handle 54 pivots, so that as the handle 54 pivots the rod moves in the direction of arrow 68 by a slight amount which is sufficient to cause lifting of the frame. When the handle is released, the downward biasing of the frame causes it to press against the camming portions 60, 62 of the rod to slide back the rod and pivot up the handle 54.

Thus, the invention provides a relatively simple holder for holding a master and a copy sheet so they can be pressed in intimate contact, and yet which enables the effective movement of a copy sheet onto and away from the master and the replacement and removal of the master. This is accomplished by thin separator members at opposite sides of the holder which can fit between the master and copy sheet, and on which transport rollers can bear to move the copy sheet without applying considerable forces tending to also move the master. The separator members can be formed as rollers with thin edge portions that are rotatably mounted on the holder about vertical axes, as compared to the transport rollers which rotate about horizontal axes. The holder includes a frame holding the separator members, the frame mounted so it can lift off and move back onto a base of the holder on which the master lies, to facilitate installation and removal of the master. Thin guides which guide the copy sheet unto the separator member or roller, are mounted on the frame to move up with it, and move down against the edges of the master when the frame is lowered, to hold the master in position. The master is stably raised by use of a lifting mechanism that includes a pair of laterally extending rods that have cams thereon that lift four corner portions of the frame when the rods are slid in one direction, and a pivoting handle that moves the rods.

Although particular embodiments of the invention have been described and illustrated therein, it is recognized that modifications and variations may readily occur to those skilled in the art, and consequently, it is intended that the claims be interpreted to cover such modifications and equivalents.

What is claimed is:

1. A microfiche contact copier holder for holding a microfiche master under a copy sheet, and where the copy sheet is moved by transport rollers that can bear against opposite sides of the copy sheet when it lies on the master, comprising:

a base which includes a light-transmitting plate; and
   a pair of separator means mounted on opposite sides of said frame, for lying under the pheripheral edges of said transport rollers and between the copy sheet and master;
   said separator means constructed to apply low drag to said copy sheet when it moves thereby, and being thin to enable substantially all of the area of said master and copy sheet lying between said separator means to be pressed into intimate contact.

2. The holder described in claim 1 including:

a copy sheet transport which includes a pair of driven transport members which are positioned to bear against the portion of a copy sheet which lies on said separator means, to move said copy sheet.

3. The holder described in claim 1 wherein:

each of said separator means comprises a rotatable roller having a thin periphery for lying between the master and copy sheet.

4. The holder described in claim 3 wherein:
each of said rollers has a radially outward portion that slopes radially outwardly and towards the level of said base, and with the radially outermost part of the roller closest to the level of said base.

5. The holder described in claim 1 including:
a frame movable towards and away from said base; and
a pair of members mounted on said frame and having thin edges lying over the area where said master can be received on said base, to hold down said master when said frame moves towards the base.

6. A microfiche contact copier holder apparatus for holding a pair of microfiche sheets comprising:
a base which includes a light-transmitting plate;
a frame movable away from and towards said base; and
a pair of rollers, each rotatably mounted on an opposite side of said frame along an axis extending primarily normal to the plane of said light transmitting plate, to lie at opposite sides of said light-transmitting plate;
each of said rollers having a thin periphery to lie between a first microfiche which lies against said plate, and a second microfiche which lies over said first microfiche.

7. The apparatus described in claim 6 including:
a copy sheet transport which includes a pair of driven rollers positioned so their peripheral edges bear against said second microfiche at locations which lie on said rollers.

8. The apparatus described in claim 6 wherein:
said rollers are tapered in thickness and are thinnest at the periphery, whereby to enable the two microfiche to lie close against one another at locations near the rollers.

9. The apparatus described in claim 6 including:
a pair of thin guide strips extending along either side of said plate and leading from one end of said plate to near said rollers, to guide the edges of said second microfiche onto said rollers.

10. The apparatus described in claim 6 including:
a pair of rods slidably extending along the width of said base each with a pair of upstanding camming portions, a handle pivotally mounted on said base and coupled to said rods to slide them along their length, and cam-follower portions on said frame engageable with said camming rod portions when the rods are slid by said handle, to lift said frame and said rollers thereon, whereby to allow said first microfiche to be installed under said rollers.

11. An exposure station comprising:
a microfiche holder which includes a transparent plate for supporting a master microfiche and a copy sheet on the master microfiche;
a light source positioned to project light up through said plate and to sheets lying thereon; and
means for moving a light sensitive sheet onto said holder, including a pair of wheels bearing against said holder near opposite sides of said transparent plate;
said holder including a pair of thin separators, located near opposite sides of said plate and under said wheels, to support the edges of a copy sheet so it can be moved with low friction with respect to said holder.

12. The station described in claim 11 wherein:
said separators comprise rollers rotatably mounted about axes substantially normal to said transparent plate.

13. Apparatus for holding a master microfiche and a copy sheet of film to be exposed by the master, comprising:
a base which includes a plate of light-transmitting material, said plate having opposite ends and opposite sides;
a frame movable away from and towards said base;
a pair of substantially parallel rods slidably extending along the width of said base, at opposite end portions thereof, each rod having a pair of upstanding camming portions, and said frame having cam follower portions in the path of said camming portions when said rods slide in a predetermined direction, so that the rods will lift four locations on said frame to raise it; and
means at a side of said base for sliding both of said rods in said direction.

14. The apparatus described in claim 13 wherein:
said means for sliding said rods includes a member disposed at a side of said base with an inner portion lying over said base and an outer portion extending beyond an edge of the base and forming a handle, said rods pivotally joined to said member to hold it in position while allowing said member to pivot when said handle is pushed down, whereby when the handle is pushed down to pivot the member on the edge of said base, the member pulls on said rods to slightly lift the frame.

* * * * *